United States Patent
Ao et al.

(10) Patent No.: US 10,133,886 B1
(45) Date of Patent: Nov. 20, 2018

(54) CARD DETECTOR AND METHOD OF CARD DETECTION

(71) Applicant: Beken Corporation, Shanghai (CN)

(72) Inventors: Mingsheng Ao, Shanghai (CN); Jiazhou Liu, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 15/912,443

(22) Filed: Mar. 5, 2018

(30) Foreign Application Priority Data

Feb. 9, 2018 (CN) .......................... 2018 1 0136313

(51) Int. Cl.
  *G06K 7/08* (2006.01)
  *G04F 10/00* (2006.01)
  *G06K 7/00* (2006.01)

(52) U.S. Cl.
  CPC ........... *G06K 7/081* (2013.01); *G04F 10/005* (2013.01); *G06K 7/0008* (2013.01); *G06K 7/0069* (2013.01)

(58) Field of Classification Search
  None
  See application file for complete search history.

(56) References Cited

U.S. PATENT DOCUMENTS

| | | | | |
|---|---|---|---|---|
| 9,354,646 B2 * | 5/2016 | Kim | .................. | G05F 1/468 |
| 2018/0115948 A1 * | 4/2018 | Choi | .................. | H04W 4/80 |

* cited by examiner

*Primary Examiner* — Kristy A Haupt

(74) *Attorney, Agent, or Firm* — Perkins Coie LLP

(57) ABSTRACT

A card detector configured to be communicatively coupled to a card reader comprises: a first comparator configured to output periodically a first comparison result by comparing a voltage for a device under test with a first reference; a second comparator outputs periodically a second comparison result by comparing a second reference voltage with the first reference voltage, wherein the second reference voltage is adjustable; a decision circuit communicatively coupled to both the first comparator and the second comparator, and decides whether a card is in proximity to the card detector by comparing the time delay relationship between the first comparison result and the second comparison result respectively at a first time point and a second time point different from the first time point, and further wakes up the card reader if the decision circuit decides that the card is in proximity to the card detector.

8 Claims, 9 Drawing Sheets

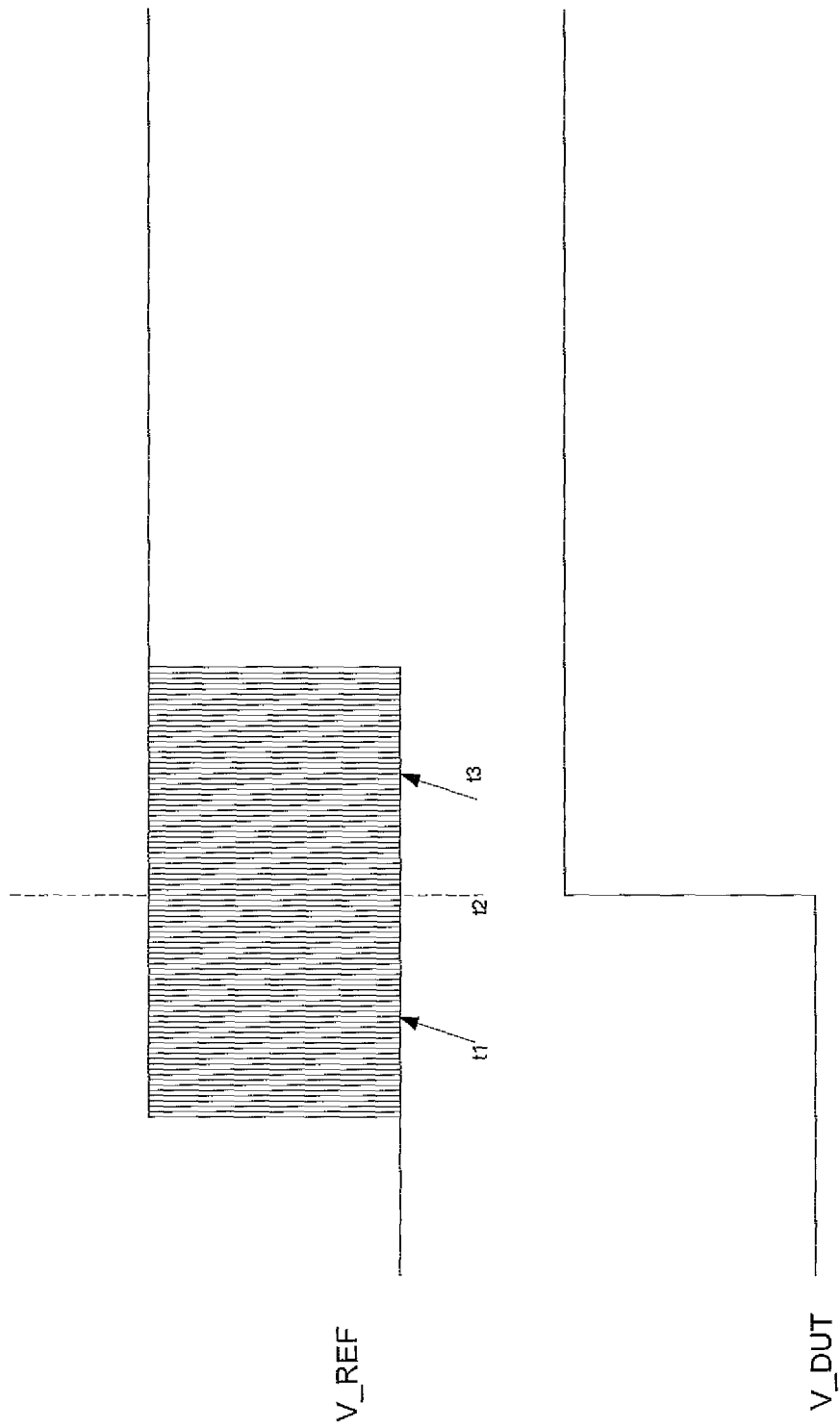

US 10,133,886 B1

CARD DETECTOR AND METHOD OF CARD DETECTION

CROSS-REFERENCE TO RELATED APPLICATIONS

This application claims priority to Chinese Application number 201810136313.8 entitled "Card Detector and Method of Card Detection," filed on Feb. 9, 2018 by Beken Corporation, which is incorporated herein by reference.

TECHNICAL FIELD

The present application relates to a digital circuit and more particularly, but not exclusively, to a card detector and a method of card detection.

BACKGROUND OF THE INVENTION

Conventionally a card detector is used to detect when a card is placed on the card reader, so as to wake up the card reader. As different card readers work at different single frequencies, it is desirable to have a card detector that can work for multiple frequencies.

BRIEF DESCRIPTION OF THE INVENTION

A card detector configured to be communicatively coupled to a card reader, wherein the card detector comprises a first comparator configured to output periodically a first comparison result by comparing a voltage for a device under test (DUT) received by a positive input port of the first comparator with a first reference voltage received by a negative input port of the first comparator; a second comparator configured to output periodically a second comparison result by comparing a second reference voltage received from a positive input port of the second comparator, with the first reference voltage received by a negative input port of the second comparator, wherein an adjustable capacitor is configured to adjust the second reference voltage; a decision circuit communicatively coupled to both the first comparator and the second comparator, and configured to decide whether a card is in proximity to the card detector by comparing a time delay relationship between the first comparison result and the second comparison result respectively at a first time point and a second time point different from the first time point, and the decision circuit is further configured to wake up the card reader if the decision circuit decides that the card is in proximity to the card detector.

According to another aspect of an embodiment, A method of detecting card by a card detector configured to be communicatively coupled to a card reader, wherein the method comprises outputting periodically, by a first comparator, a first comparison result by comparing a voltage for a device under test (DUT) received by a positive input port of the first comparator with a first reference voltage received by a negative input port of the first comparator; outputting periodically, by a second comparator, a second comparison result by comparing a second reference voltage received from a positive input port of the second comparator with the first reference voltage received by a negative input port of the second comparator; deciding, by a decision circuit communicatively coupled to both the first comparator and the second comparator, whether a card is in proximity to the card detector by comparing a time delay relationship at least between the first comparison result and the second comparison result respectively at a first time point and a second time point different from the first time point, and waking up, by the decision circuit, the card reader if the card is in proximity to the card detector.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is a sequence diagram according to an embodiment of the invention.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details.

Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1A:
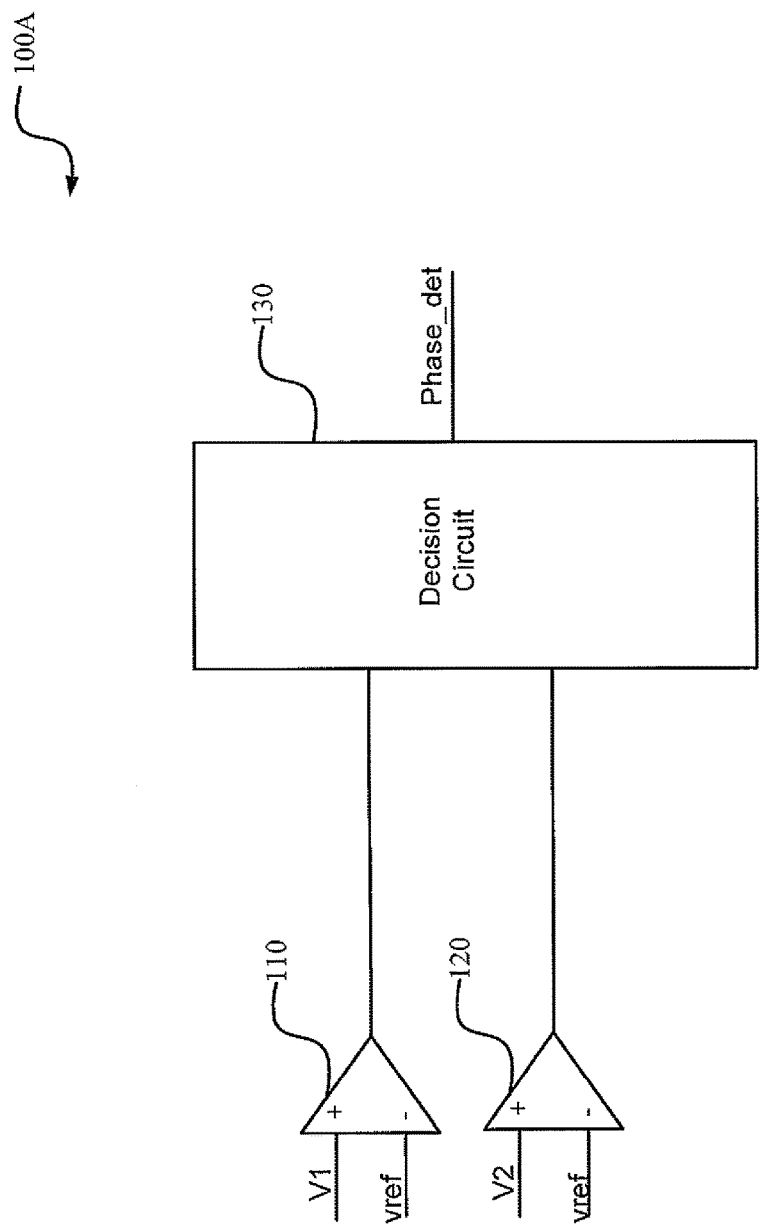
FIG. 1A is a circuit diagram of a card detector according to an embodiment of the invention.

FIG. 1A is a circuit diagram of a card detector 100A according to an embodiment of the invention. The card detector 100A is configured to be communicatively coupled to a card reader. For example, the card detector 100A may be integrated into a card reader, that is, the card detector 100A is a component of the card reader.

Referring to FIG. 1A, the card detector 100A comprises a first comparator 110, a second comparator 120 and a decision circuit 130.

The first comparator 110 outputs periodically a first comparison result by comparing a voltage for a device under test (DUT) V1 received by a positive input port of the first comparator 110 with a first reference voltage vref received by a negative input port of the first comparator 110. The period of the output of the first comparator 110 may be 32 kHz. The first result may be a digital sequence 1 or 0, which represents either the voltage for a device under test V1 is larger than the first reference voltage vref (1), or the voltage for a device under test V1 is smaller than the first reference voltage verf (0). The second comparator 120 outputs periodically a second comparison result by comparing a second reference voltage (V_REF) V2 received from a positive input port of the second comparator 120, with the first reference voltage verf received by a negative input port of the second comparator 120. The second result may be a digital sequence 1 or 0, which represents either V2 is larger than vref (1), or V2 is smaller than verf (0). Note V2(V_REF) is adjustable according to a current charging the variable capacitors C_REF during calibration phase, as will be discussed in further detail with respect to FIG. 4. Note during card detection phase, V2(V_REF) should maintain unchanged so as to perform card detection. The first reference voltage vref is a base current provided by the circuit.

The decision circuit 130 is communicatively coupled to both the first comparator 110 and the second comparator 120. The decision circuit 130 decides whether a card is in proximity to the card detector 100A by comparing a time delay relationship between the first comparison result and the second comparison result respectively at a first time point and a second time point different from the first time point. Further, the decision circuit 130 wakes up the card reader if the decision circuit 130 decides that the card is in proximity to the card detector.

Figure 1B:
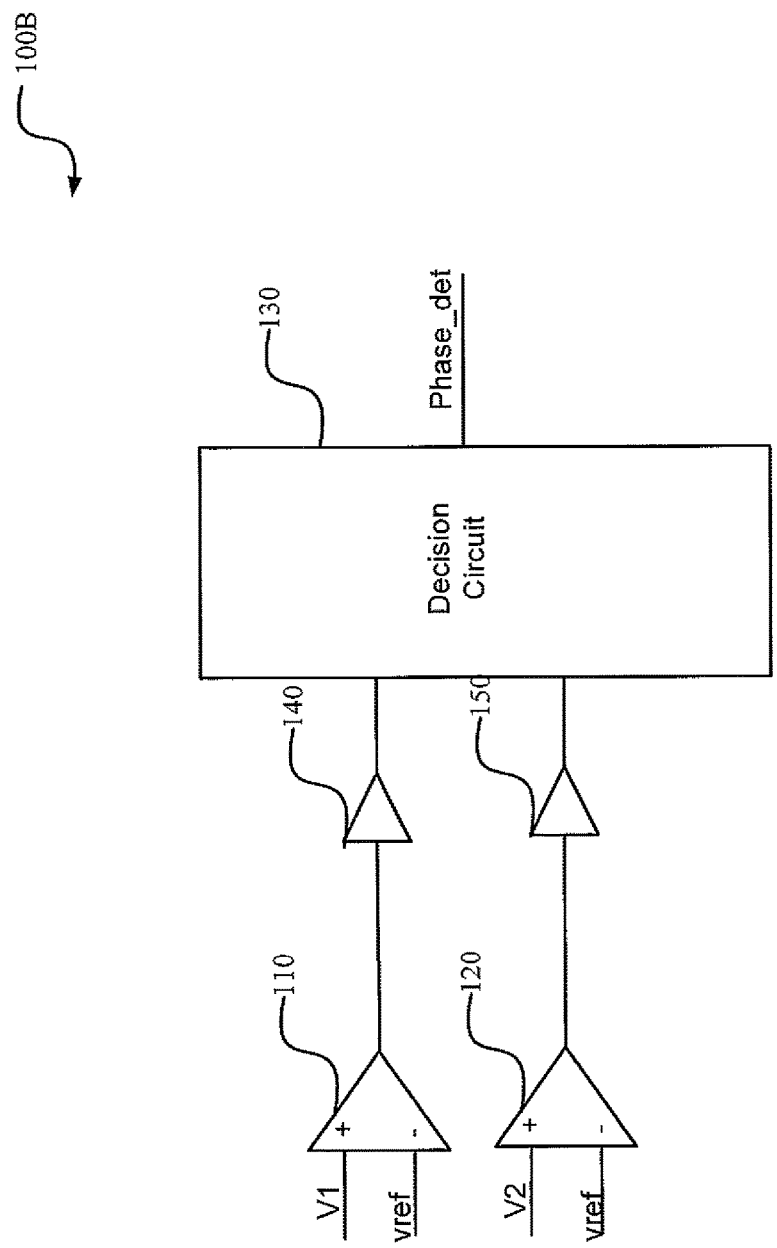
FIG. 1B is a circuit diagram of a card detector according to an embodiment of the invention.

FIG. 1B is a circuit diagram of a card detector 100B according to an embodiment of the invention. In addition to the first comparator 110, the second comparator 120 and the decision circuit 130 discussed in FIG. 1A, the card detector 100B further comprises a first buffer 140 and a second buffer 150.

The first buffer 140 is communicatively coupled to the first comparator 110 and configured to generate a first buffered comparison result from the first comparison result. The second buffer 150 is communicatively coupled to the second comparator 120 and configured to generate a second buffered comparison result from the second comparison result. The function of the first buffer 140 and the second buffer 150 is to make the rising edge or falling edge more sharp. The decision circuit 130 is communicatively coupled to both the first buffer 140 and the second buffer 150, and configured to decide whether the card is in proximity to the card detector by comparing the time delay relationship between the first buffered comparison result with the second buffered comparison result respectively at the first time point and the second time point.

Alternatively, the decision circuit 130 comprises a bang-bang phase detector (BBPD) communicatively coupled to both the first buffer 140 and the second buffer 150, wherein the bang-bang phase detector 130 is configured to decide whether the card is in proximity to the card detector by determining whether time delay relationship between the first buffered comparison result and the second buffered comparison result reverses between the first time point and the second time point.

Figure 2A:
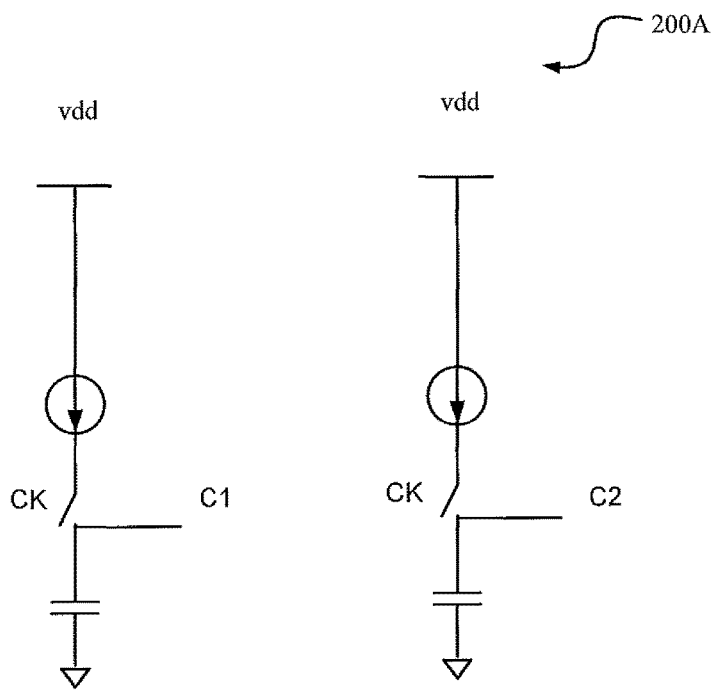
FIG. 2A is a circuit diagram 200A of two current sources according to an embodiment of the invention.

FIG. 2A is a circuit diagram 200A of two current sources according to an embodiment of the invention.

Figure 2B:
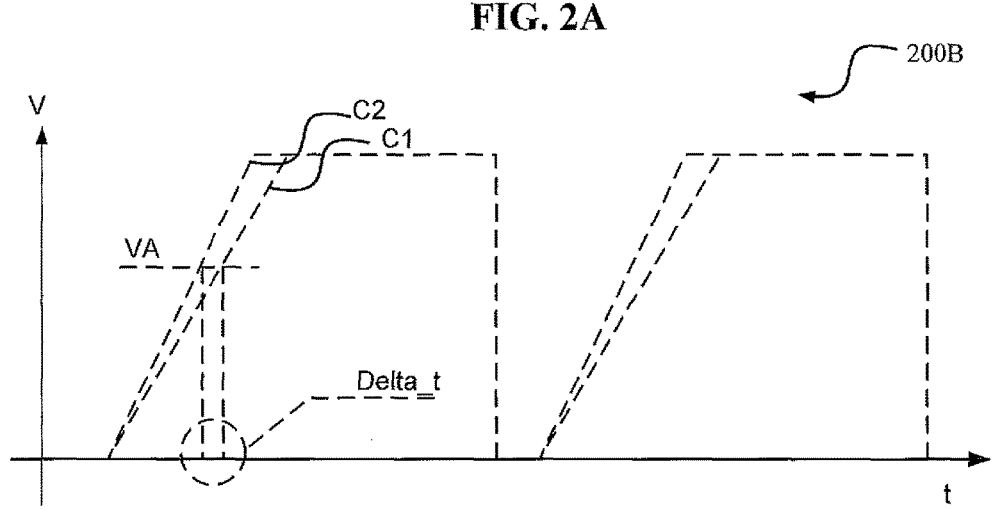
FIG. 2B is a periodical charging diagram 200B between the two current sources.

FIG. 2B is a periodical charging diagram between the two current sources.

FIGS. 2A and 2B illustrate the principle of how the card detector works.

When a same-frequency clock is used to control two current sources or current sinks, ideally the two current sources or current sinks do not have mismatch. Therefore in this case suppose the two capacitors are charged or discharged, and the capacitances of the two capacitors differ. As shown in FIG. 2B, in each period (the voltage can be from high to low, or from low to high), the slope of the resulting voltages will be different. A comparison between the first result of V1 compared with the first reference voltage vref and the second result of V2 compared with the first reference voltage vref, as shown in any of FIG. 3A-FIG. 3C, will result in two block waves with same frequency and different phases. The phase error can be detected by a phase detector, while the phase error represents different slopes.

Still referring to FIG. 2B, it is known that $$Q = CV, \Delta V = \frac{\Delta Q}{\Delta C} = \frac{i \Delta t}{\Delta C}. \quad C1$$

represents the capacitance corresponding to the voltage for a device under test V_DUT (V1), and C2 represents the capacitance corresponding to the voltage for the second reference voltage V_REF (V2). Assuming that the difference between C1 and C2 are 10 fF, with 50 nA current to charge the two capacitors.

$\Delta t=(C1-C2) \times VA/i$. Assume that C1-C2=10 fF, i=50 nA, VA=1.2V, therefore, the time difference at 1.2V is 240 ns, and this error can be easily detected by the phase detector. Note fF represents Femtofarad, which is a unit of capacitance equal to $1 \times 10^{-15}$ farads. With the relationship between $\Delta t$ and $\Delta C$, if it is desirable to calibrate the phase difference which is represented by $\Delta t$, $\Delta C$ can be adjusted so as to align the timing or in other word, reduce phase difference between the phase corresponding to V1 and the phase corresponding to V2. For example, vref may take the value of VA, which equals 1.2V. In FIG. 2B, two charging diagrams are shown, since the clock of the current source CK is periodical. In the left block of the charging diagram, the slope of the left line corresponds to C2, and the slope of the right line corresponds to C1. C1=C2+$\Delta C$.

Figure 3A:
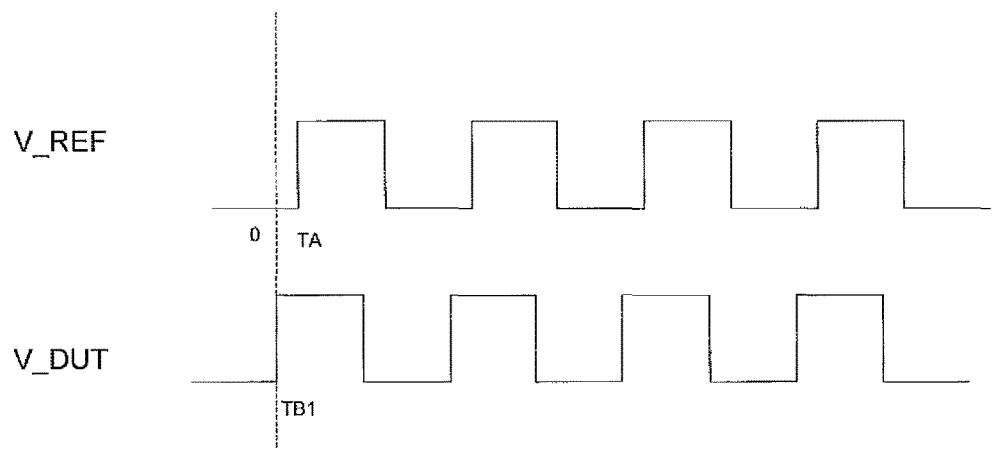
FIG. 3A-3C are sequence diagrams according to an embodiment of the invention.
Figure 3B:
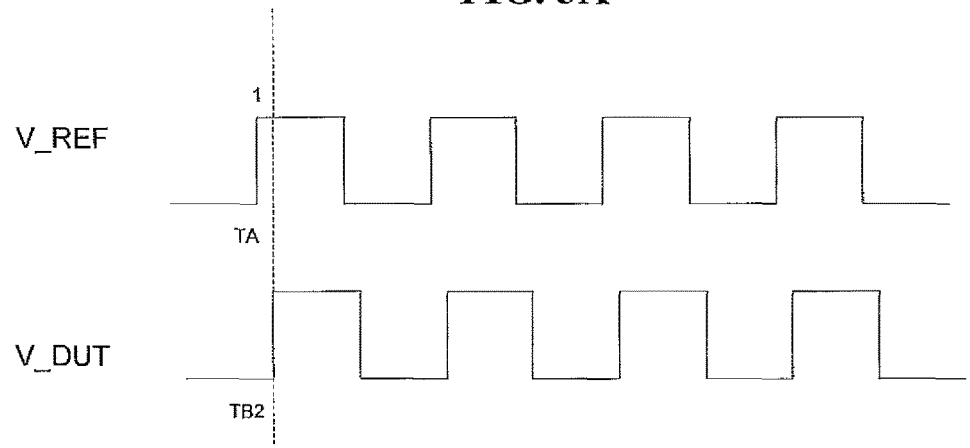
Figure 3C:
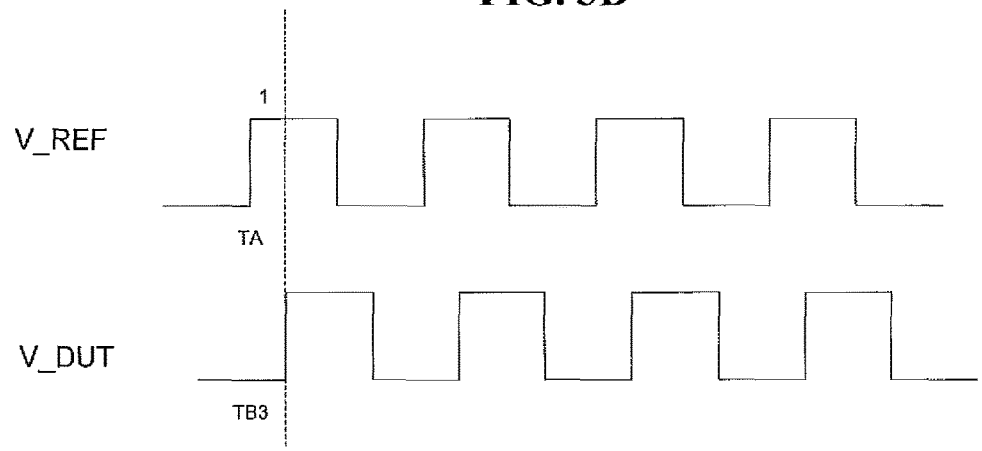

FIG. 3A-3C are sequence diagrams according to an embodiment of the invention.

In FIG. 3A, at first, a card is not in proximity to the card detector. Initially, a clock ck_REF of a second reference voltage V_REF (V2) lags behind a clock ck_DUT of a voltage for a device under test V_DUT (V1), as a rising edge of the clock ck_REF occurs at TA, while a rising edge of the clock ck_DUT occurs at TB1, and TA is behind TB1. In other words, when the rising edge of the clock ck_DUT samples the clock ck_REF, the result is 0.

In FIG. 3B, the card has been put on the card detector. In other words, the card is in proximity to the card detector. Suppose the capacitance resulting from the card is 10 fF, therefore the capacitance corresponding to C1 (corresponding to the voltage for a device under test V_DUT (V1)) increases. $\Delta t=(C1-C2) \times VA/i$, which means the phase of clock ck_DUT lags behind. Accordingly, the clock ck_REF of the second reference voltage V_REF (V2) leads the clock ck_DUT of the a voltage for the device under test V_DUT (V1), as a rising edge of the clock ck_REF occurs at TA, while a rising edge of the clock ck_DUT occurs at TB2, and TA is ahead of TB2. In other words, when the rising edge of the clock ck_DUT samples the clock ck_REF, the result is 1. In the FIG. 3A scenario which is corresponding to a first time point, the clock ck_DUT leads the clock ck_REF, while in the FIG. 3B scenario which is corresponding to a second time point, the clock ck_DUT lags behind the clock ck_REF. In other words, the time delay relationship between the first comparison result and the second comparison result (V_REF vs V_DUT at the first time point) and the time delay relationship between the first comparison result and the second comparison result (V_REF vs V_DUT) at the second time point changes, or in other words, reverses, which means a card has been put to be in proximity to the card detector 100A. The first time is different from the second time. For example, the first sampling time TB1 is different from the second sampling time TB2.

Alternatively, to avoid the possible erroneous detection of card proximity caused by a noise, the card detector 100A detects clocks for a third time TB3. In FIG. 3C, similar to FIG. 3B, it is detected that the clock ck_REF of the second reference voltage V_REF (V2) leads the clock ck_DUT of the voltage for the device under test V_DUT (V1), as a rising edge of the clock ck_REF occurs at TA, while a rising edge of the clock ck_DUT occurs at TB3, and TA is ahead of TB3. In other words, when the rising edge of the clock ck_DUT samples the clock ck_REF, the result is 1. Therefore, the card detector can guarantee that a card is in proximity of the card reader.

Figure 4:
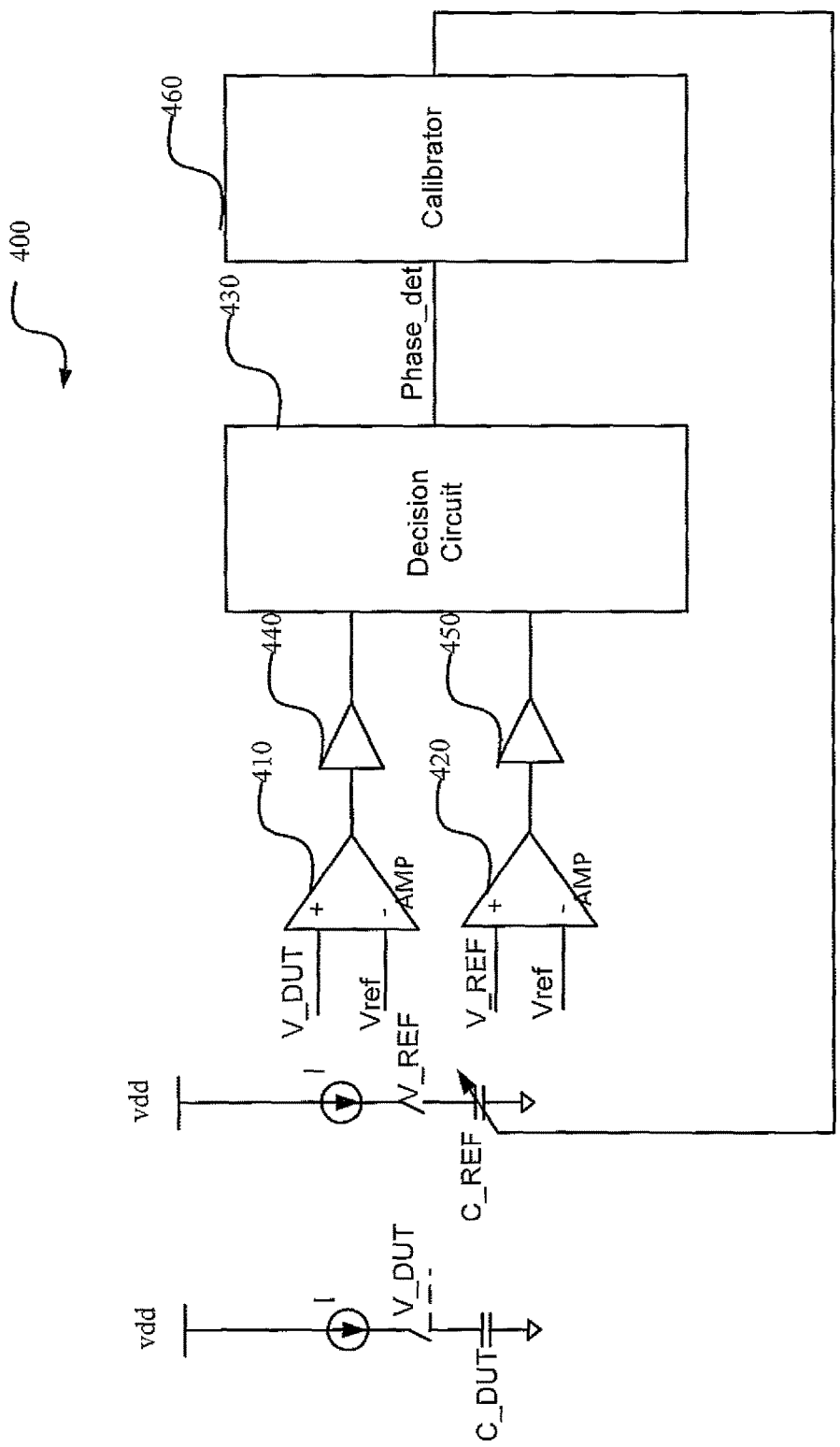
FIG. 4 is a circuit diagram of a card detector according to another embodiment of the invention.

As shown in FIG. 4, the card detector needs to go through a calibration process, to reduce or eliminate the error between capacitor for the device under test C_DUT and the capacitor for the second reference voltage C_REF in the absence of a card. When there is no card on the card detector, a capacitance still exists at the end of the card reader where the card is to be placed. Such capacitance is related to manufacturing process and the circuit used. Therefore, C_REF is used to compensate the difference between C_DUT and C_REF into a small error. That is, in the absence of a card, it is desirable to have a known relationship between the C_DUT and C_REF. In other words, the error between C_DUT and C_REF should be far more less than the capacitance generated by placing a card put on the card reader. If the card produces a capacitance of 10 fF, then in the absence of a card, the error between C_DUT and C_REF should be calibrated to less than 5 fF. For example, when the calibration is completed, C_DUT is smaller than C_REF for 5 fF, and this value can be determined according to the actual working environment. Further upon placing the card on the card reader, C_DUT value will become 10 fF larger than the value that has been calibrated. Therefore C_DUT will be 5 fF larger than C_REF, which will change the relationship between C_DUT and C_REF, thus change the time delay relationship between V_DUT and V_REF, therefore the placement of the card on the card reader can be detected.

FIG. 4 is a circuit diagram of a card detector according to another embodiment of the invention.

Referring to FIG. 4, the card detector 400 comprises a first comparator 410, a second comparator 420, a first buffer 440, a second buffer 450 and a decision circuit 430. As the first comparator 410, the second comparator 420, the first buffer 440, the second buffer 450 and the decision circuit 430 are respectively similar to corresponding a first comparator 110, a second comparator 120, a first buffer 140, a second buffer 150 and a decision circuit 130 discussed in FIG. 1A and FIG. 1B, their detailed descriptions are omitted. In FIG. 4, the card detector 400 further comprises a calibrator 460 and an adjustable capacitor C_REF. The calibrator 460 is communicatively coupled to the decision circuit 430. In this embodiment, the decision circuit 430 can be a Bang-bang phase detector (BBPD). The adjustable capacitor C_REF is communicatively coupled to the calibrator 460, wherein the calibrator 460 is further configured to adjust the second reference voltage V_REF by adjusting the adjustable capacitor C_REF, so as to calibrate the phase difference between the voltage for a device under test V_DUT and the second reference voltage V_REF.

Referring back to FIG. 3A-FIG. 3C, that the phase is ahead indicates that the corresponding capacitance is smaller. On the other hand, that the phase is behind indicates that the capacitance is larger. The phase for V_DUT and V_REF are calibrated. In the absence of a card (for example, FIG. 3A), the result of the calibration is for example, C_REF is slightly larger than C_DUT, which may be 3 to 4 LSB capacitor units (to ensure that the introduction of the card will increase 6 to 8 LSB or even larger). As a result, before the placement of the card, the phase of V_DUT leads the phase of V_REF. During the absence of card, when V_DUT is used to sample V_REF, such as at time TB1, there will always be "0" detected. When the card is placed on the card detector (for example, FIG. 3B and FIG. 3C), C_DUT will become larger than C_REF, thus changing the relative size of the C_DUT and C_REF, which will lead to that V_DUT phase lags behind V_REF. Therefore when using V_DUT to sample V_REF (for example, at TB2 or at TB3), a determined "1" will always be detected. Therefore it is determined that the card is placed on the card reader.

Figure 5A:
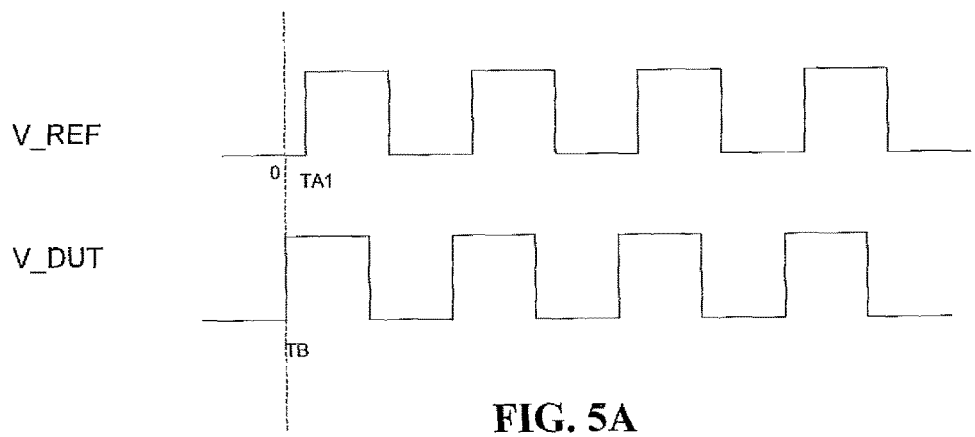
FIG. 5A-FIG. 5C are sequence diagrams illustrating the calibration process according to an embodiment of the invention.
Figure 5B:
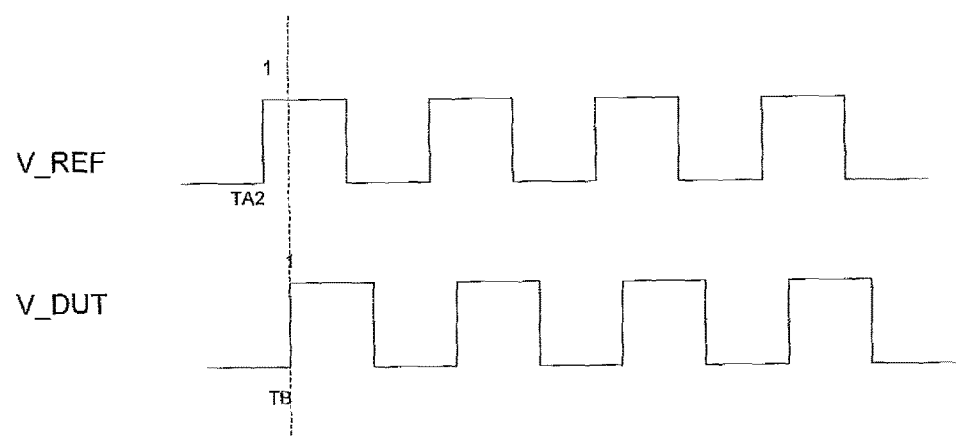
Figure 5C:
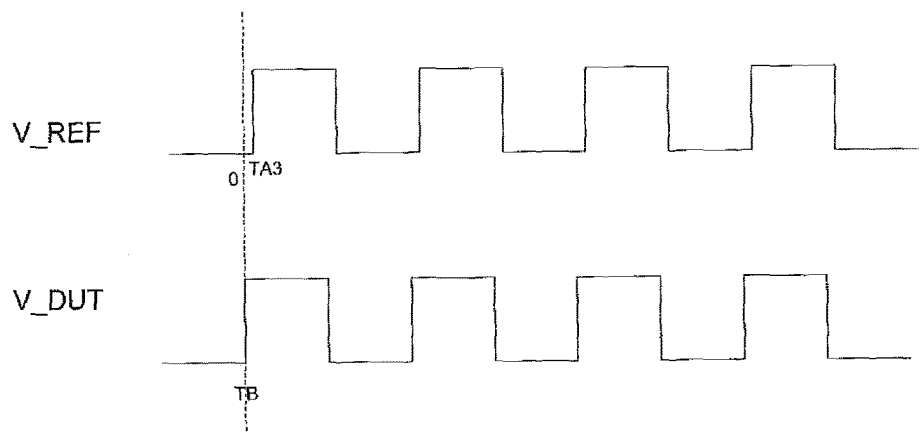

FIG. 5A-FIG. 5C are sequence diagrams illustrating the calibration process according to an embodiment of the invention.

As shown in FIG. 5A, at first, when using the V_DUT to sample V_REF, there is a "0" detected, which means V_DUT leads V_REF, or put it in other words, C_DUT is smaller than C_REF. Then the card detector decreases the adjustable capacitor C_REF gradually and periodically detects the sampling result. Then in FIG. 5B, when using the V_DUT to sample V_REF, there is a "1" detected, which means V_DUT lags behind V_REF, or put it in other words, C_DUT is larger than C_REF. Then the card detector increases the adjustable capacitor C_REF gradually and periodically detects the sampling result. Then in FIG. 5C, when using the DUT to sample V_REF, there is again a "0" detected, which means V_DUT leads REF, or put it in other words, C_DUT is smaller than C_REF. in FIG. 5C, the card detector makes sure that C_REF is slightly larger than C_DUT, which may be 3 to 4 LSB capacitor units in FIG. 5C, such that when the card is placed on card reader, the sampling result will reverse.

FIG. 6 is a sequence diagram according to an embodiment of the invention. as shown in FIG. 6, V_DUT is used to sample V_REF. When V_DUT samples V_REF at t1, the output of decision circuit 130: phase_det=1, which means V_REF leads V_DUT, and the result may change from 000 . . . 0 to 111 . . . 1. When V_DUT samples V_REF at t3, the output decision circuit: phase_det=0, which means V_REF lags behind V_DUT, and the result may change from 111 . . . 1 to 000 . . . 0. Wherein 000 . . . 0 represents the minimum cap and 111 . . . 1 represents the maximum cap.

Figure 7:
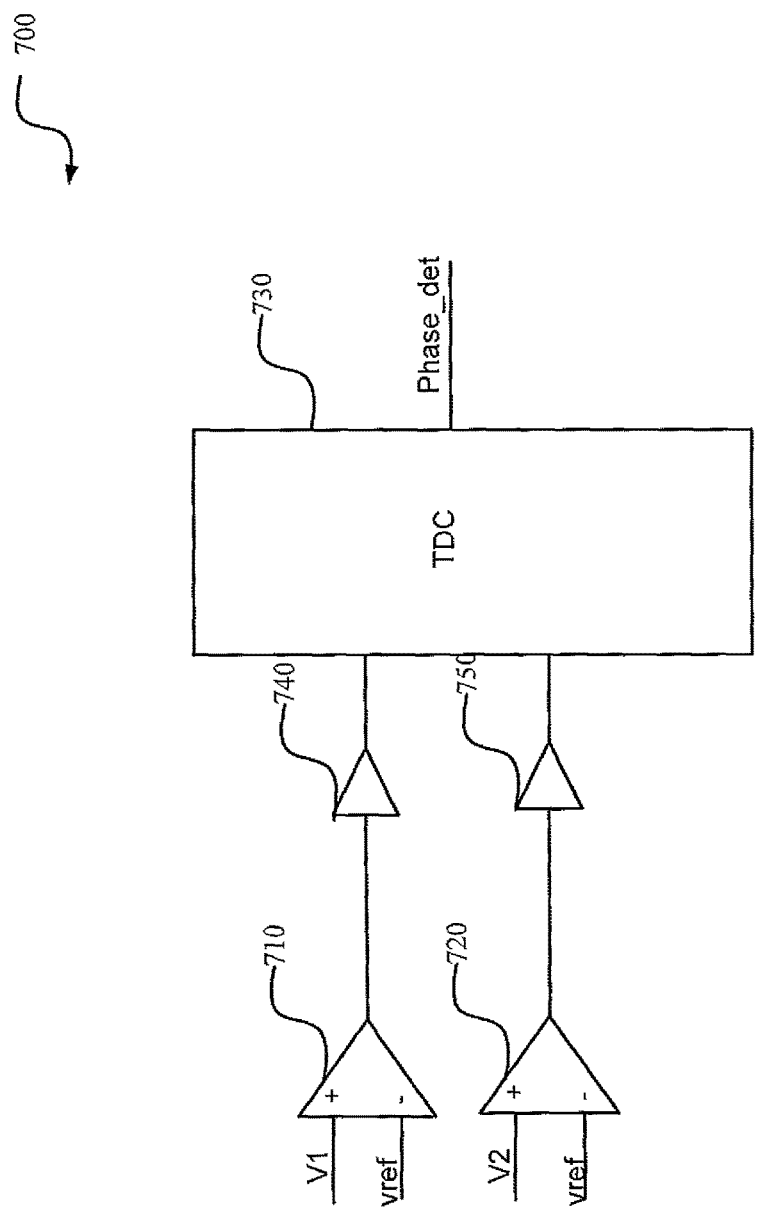
FIG. 7 is a circuit diagram of a card detector according to another embodiment of the invention.

FIG. 7 is a circuit diagram of a card detector according to another embodiment of the invention.

Referring to FIG. 7, the card detector 700 comprises a first comparator 710, a second comparator 720, a first buffer 740, a second buffer 750 and a decision circuit. As the first comparator 710, the second comparator 720, the first buffer 740, the second buffer 750 and the decision circuit are respectively similar to corresponding a first comparator 110, a second comparator 120, a first buffer 140, a second buffer 150 and a decision circuit 130 discussed in FIG. 1A and FIG. 1B, their detailed descriptions are omitted. In FIG. 7, the decision circuit may comprise a time to digital converter (TDC) 730 communicatively coupled to both the first buffer 740 and the second buffer 750, wherein the time to digital converter (TDC) 730 is configured to decide whether the card is in proximity to the card detector by determining according to a difference between the time delay between the first buffered comparison result and the second buffered comparison result respectively at the first time point and the second time point. To be specific, unlike the BBPD detector which can only detect 1 bit information, the TDC 730 can detect multi-bits information. For example, depending on the accuracy of the TDC, for example, the TDC has an accuracy of 10 ns, the TDC 730 may need to check the 2-3 LSB of the output of the TDC 730, or phase delta phase_det to determine if the phase delta, which can be represented by time difference, corresponding to the increase of 2-3 LSB of the capacitor. If the change of phase delta phase_det corresponds to the increase of 2-3 LSB of the capacitor, it can be determined that a card has been placed on the card detector 700. Otherwise, there is no detection of card on the card detector 700. The amount of LSB may be varied depending on the accuracy and size of the TDC.

Figure 8:
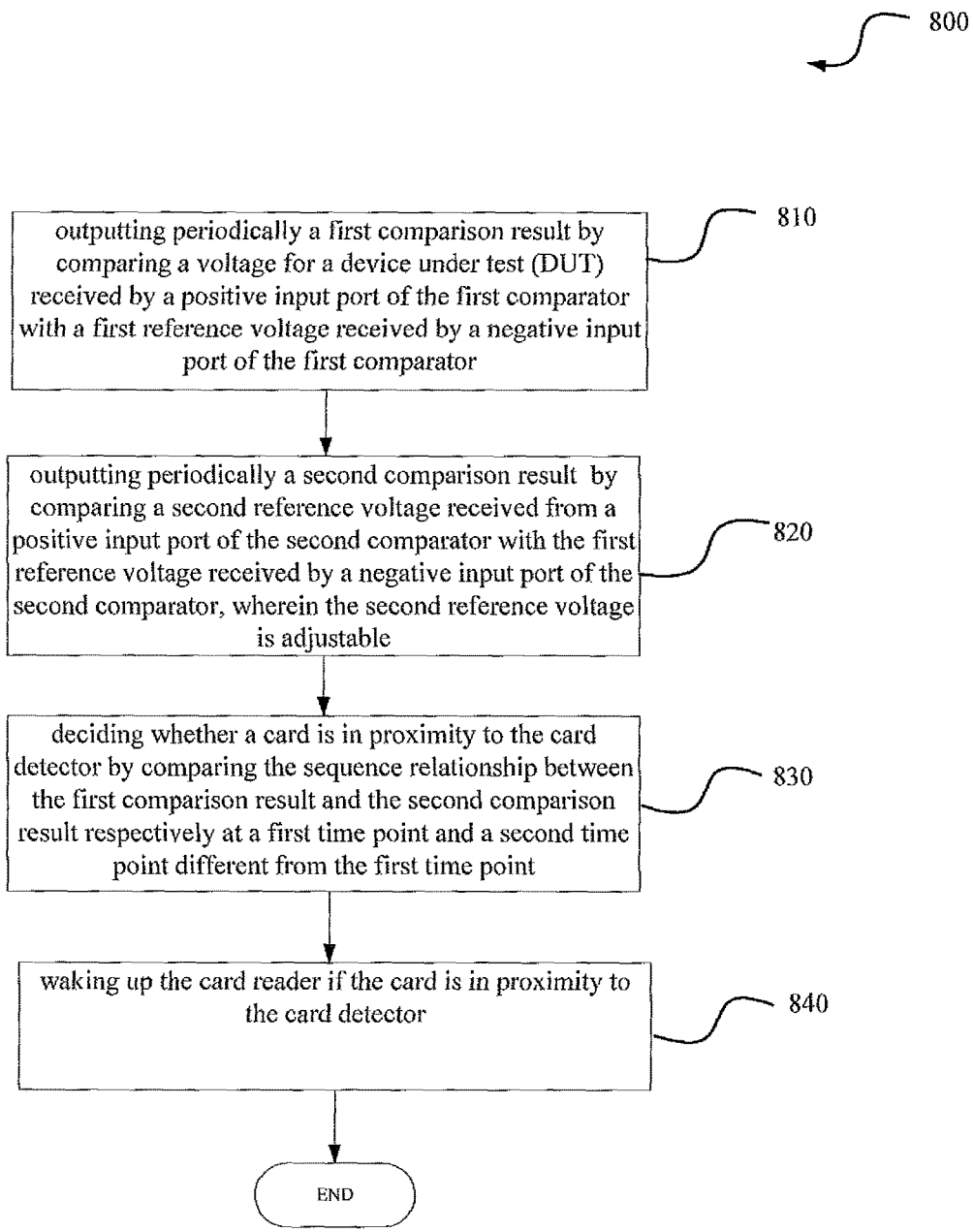
FIG. 8 is a flow chart illustrating a method of detecting and waking up a card reader according to an embodiment of the invention.

FIG. 8 is a flow chart illustrating a method 800 of detecting and waking up a card reader according to an embodiment of the invention.

The method 800 of detecting card by a card detector configured to be communicatively coupled to a card reader comprises: outputting periodically in block 810, by a first comparator, a first comparison result by comparing a voltage for a device under test (DUT) received by a positive input port of the first comparator with a first reference voltage received by a negative input port of the first comparator; outputting periodically in block 820, by a second comparator, a second comparison result by comparing a second reference voltage received from a positive input port of the second comparator with the first reference voltage received by a negative input port of the second comparator; deciding in block 830, by a decision circuit communicatively coupled to both the first comparator and the second comparator, whether a card is in proximity to the card detector by comparing a time delay relationship between at least the first comparison result and the second comparison result respectively at a first time point and a second time point different from the first time point, and waking up in block 840, by the decision circuit, the card reader if the card is in proximity to the card detector.

Alternatively or additionally, the method 800 further comprises (not shown in the drawings) generating, by a first buffer communicatively coupled to the first comparator, a first buffered comparison result from the first comparison result; generating, by a second buffer communicatively coupled to the second comparator, a second buffered comparison result from the second comparison result; and deciding, by the decision circuit is communicatively coupled to both the first buffer and the second buffer, whether the card is in proximity to the card detector by comparing the time delay relationship between the first buffered comparison result and the second buffered comparison result respectively at the first time point and the second time point.

Alternatively or additionally, deciding whether the card is in proximity to the card detector is further implemented by deciding whether the card is in proximity to the card detector by determining whether the time delay relationship between the first buffered comparison result and the second buffered comparison result reverses between the first time point and the second time point.

Alternatively or additionally, the method 800 further comprises (not shown in the drawings) outputting adjusted second reference voltage by adjusting the adjustable capacitor.

Alternatively or additionally, deciding whether the card is in proximity to the card detector is further implemented by determining according to a difference between the time delay between the first buffered comparison result and the second buffered comparison result respectively at the first time point and the second time point.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:

1. A card detector configured to be communicatively coupled to a card reader, wherein the card detector comprises:
    a first comparator configured to output periodically a first comparison result by comparing a voltage for a device under test (DUT) received by a positive input port of the first comparator with a first reference voltage received by a negative input port of the first comparator;
    a second comparator configured to output periodically a second comparison result by comparing a second reference voltage received from a positive input port of the second comparator, with the first reference voltage received by a negative input port of the second comparator;
    a decision circuit communicatively coupled to both the first comparator and the second comparator, and configured to decide whether a card is in proximity to the card detector by comparing a time delay relationship at least between the first comparison result and the second comparison result respectively at a first time point and a second time point different from the first time point, and
    the decision circuit is further configured to wake up the card reader if the decision circuit decides that the card is in proximity to the card detector; wherein the card detector further comprises—
    a first buffer communicatively coupled to the first comparator and configured to generate a first buffered comparison result from the first comparison result;
    a second buffer communicatively coupled to the second comparator and configured to generate a second buffered comparison result from the second comparison result; and
    wherein the decision circuit is communicatively coupled to both the first buffer and the second buffer, and configured to decide whether the card is in proximity to the card detector by comparing the time delay relationship between the first buffered comparison result with the second buffered comparison result respectively at the first time point and the second time point.

2. The card detector of claim 1, wherein the decision circuit comprises a bang-bang phase detector communicatively coupled to both the first buffer and the second buffer, wherein the bang-bang phase detector is configured to decide whether the card is in proximity to the card detector by determining whether time delay relationship between the first buffered comparison result and the second buffered comparison result reverses between the first time point and the second time point.

3. The card detector of claim 2, further comprising
a calibrator communicatively coupled to the bang-bang phase detector; and
an adjustable capacitor communicatively coupled to the calibrator, wherein the calibrator is further configured to adjust the second reference voltage by adjusting the adjustable capacitor.

4. The card detector of claim 1, wherein the decision circuit comprises a time to digital converter (TDC) communicatively coupled to both the first buffer and the second buffer, wherein the time to digital converter is configured to decide whether the card is in proximity to the card detector by determining according to a difference between the time delay between the first buffered comparison result and the second buffered comparison result respectively at the first time point and the second time point.

5. A method of detecting card by a card detector configured to be communicatively coupled to a card reader, wherein the method comprises:
outputting periodically, by a first comparator, a first comparison result by comparing a voltage for a device under test (DUT) received by a positive input port of the first comparator with a first reference voltage received by a negative input port of the first comparator;
outputting periodically, by a second comparator, a second comparison result by comparing a second reference voltage received from a positive input port of the second comparator with the first reference voltage received by a negative input port of the second comparator;
deciding, by a decision circuit communicatively coupled to both the first comparator and the second comparator, whether a card is in proximity to the card detector by comparing a time delay relationship at least between the first comparison result and the second comparison result respectively at a first time point and a second time point different from the first time point, and
waking up, by the decision circuit, the card reader if the card is in proximity to the card detector; wherein the method further comprises—
generating, by a first buffer communicatively coupled to the first comparator, a first buffered comparison result from the first comparison result;
generating, by a second buffer communicatively coupled to the second comparator, a second buffered comparison result from the second comparison result; and
deciding, by the decision circuit is communicatively coupled to both the first buffer and the second buffer, whether the card is in proximity to the card detector by comparing the time delay relationship between the first buffered comparison result and the second buffered comparison result respectively at the first time point and the second time point.

6. The method of claim 5, deciding whether the card is in proximity to the card detector is further implemented by deciding whether the card is in proximity to the card detector by determining whether the time delay relationship between the first buffered comparison result and the second buffered comparison result reverses between the first time point and the second time point.

7. The method of claim 6, further comprising
adjusting the second reference voltage by adjusting the adjustable capacitor.

8. The method of claim 5, wherein deciding whether the card is in proximity to the card detector is further implemented by determining according to a difference between the time delay between the first buffered comparison result and the second buffered comparison result respectively at the first time point and the second time point.

* * * * *